US012227171B2

United States Patent
Yasui

(10) Patent No.: US 12,227,171 B2
(45) Date of Patent: Feb. 18, 2025

(54) VEHICLE CONTROL DEVICE, VEHICLE, METHOD OF CONTROLLING VEHICLE CONTROL DEVICE, AND NON-TRANSITORY COMPUTER-READABLE STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 158 days.

(21) Appl. No.: 17/703,583

(22) Filed: Mar. 24, 2022

(65) Prior Publication Data

US 2022/0314976 A1 Oct. 6, 2022

(30) Foreign Application Priority Data

Mar. 31, 2021 (JP) ................. 2021-061588

(51) Int. Cl.
  *B60W 30/09* (2012.01)
  *B60W 10/18* (2012.01)
  *B60W 10/20* (2006.01)
(52) U.S. Cl.
  CPC ............ *B60W 30/09* (2013.01); *B60W 10/18* (2013.01); *B60W 10/20* (2013.01);
  (Continued)
(58) Field of Classification Search
  CPC ......... B60W 30/09; B60W 2554/4029; B60W 2552/53; B60W 2540/18; B60W 2710/18; B60W 2710/20
  (Continued)

(56) References Cited

U.S. PATENT DOCUMENTS 6,092,619 A   7/2000 Nishikawa et al.
8,521,414 B2  8/2013 Urai et al.
(Continued)

FOREIGN PATENT DOCUMENTS

CN     112477856 A     3/2021
DE  102009020649 A1   11/2010
(Continued)

OTHER PUBLICATIONS

Almutairi et al., "Fuzzy-based Collision Avoidance System for Autonomous Driving in Complicated Traffic Scenarios," 2018, Publisher: IEEE.*

(Continued)

*Primary Examiner* — Tuan C To
(74) *Attorney, Agent, or Firm* — Thomas | Horstemeyer, LLP

(57) ABSTRACT

This invention provides a vehicle control device for controlling a vehicle, which comprises a first detection unit configured to detect an out-of-lane region outside a lane in which the vehicle is traveling; a second detection unit configured to detect an obstacle; and a determination unit configured to determine that performing steering control in the out-of-lane region is approved by a driver when the vehicle enters the out-of-lane region in response to a steering operation by the driver in a case where the second detection unit detects the obstacle, the first detection unit detects the out-of-lane region, and the vehicle and the obstacle have a predetermined relationship.

13 Claims, 9 Drawing Sheets

(52) U.S. Cl.
CPC ..... *B60W 2540/18* (2013.01); *B60W 2552/53* (2020.02); *B60W 2554/4029* (2020.02); *B60W 2710/18* (2013.01); *B60W 2710/20* (2013.01)

(58) Field of Classification Search
USPC .......................................................... 701/26
See application file for complete search history.

(56) References Cited

U.S. PATENT DOCUMENTS

| | | | |
|---|---|---|---|
| 8,849,515 B2* | 9/2014 | Moshchuk | B62D 15/0265 340/436 |
| 9,940,528 B2* | 4/2018 | Higgins-Luthman | H04N 25/76 |
| 10,106,194 B2 | 10/2018 | Yang et al. | |
| 10,145,953 B2 | 12/2018 | Talamonti et al. | |
| 10,267,911 B2 | 4/2019 | Talamonti et al. | |
| 10,451,730 B2 | 10/2019 | Talamonti et al. | |
| 10,471,954 B2 | 11/2019 | Saiki | |
| 10,514,457 B2 | 12/2019 | Talamonti et al. | |
| 10,754,029 B2 | 8/2020 | Talamonti et al. | |
| 10,839,689 B2 | 11/2020 | Mizoguchi | |
| 10,953,882 B2 | 3/2021 | Fujii | |
| 10,981,569 B2 | 4/2021 | Hashimoto et al. | |
| 11,091,152 B2 | 8/2021 | Tsuchiya et al. | |
| 11,142,246 B2 | 10/2021 | Fujii | |
| 11,214,300 B2 | 1/2022 | Schiebahn et al. | |
| 11,573,090 B2 | 2/2023 | Rosenblum et al. | |
| 11,577,720 B2 | 2/2023 | Miyamoto et al. | |
| 11,708,110 B2 | 7/2023 | Fujii | |
| 11,734,848 B2 | 8/2023 | Springer et al. | |
| 11,745,796 B2 | 9/2023 | Fujii | |
| 2010/0030426 A1* | 2/2010 | Okita | B60W 40/072 701/41 |
| 2010/0121532 A1 | 5/2010 | Urai et al. | |
| 2011/0106376 A1* | 5/2011 | Tijerina | B60Q 1/40 701/36 |
| 2017/0225618 A1* | 8/2017 | Tanaka | B60N 2/90 |
| 2017/0274931 A1 | 9/2017 | Yang et al. | |
| 2017/0327110 A1 | 11/2017 | Inoue et al. | |
| 2017/0334483 A1 | 11/2017 | Schiebahn et al. | |
| 2018/0178783 A1 | 6/2018 | Saiki | |
| 2018/0281804 A1 | 10/2018 | Talamonti et al. | |
| 2018/0281854 A1 | 10/2018 | Talamonti et al. | |
| 2018/0281855 A1 | 10/2018 | Talamonti et al. | |
| 2018/0281856 A1 | 10/2018 | Talamonti et al. | |
| 2018/0284266 A1 | 10/2018 | Talamonti et al. | |
| 2018/0286242 A1 | 10/2018 | Talamonti et al. | |
| 2018/0297639 A1 | 10/2018 | Fujii | |
| 2018/0345978 A1 | 12/2018 | Fujii | |
| 2019/0071077 A1* | 3/2019 | Miyamoto | G01S 15/93 |
| 2019/0073540 A1 | 3/2019 | Yamada et al. | |
| 2019/0080609 A1 | 3/2019 | Mizoguchi | |
| 2019/0143983 A1 | 5/2019 | Hashimoto et al. | |
| 2019/0270447 A1 | 9/2019 | Tsuchiya et al. | |
| 2020/0047746 A1* | 2/2020 | Ji | B60W 10/184 |
| 2020/0079394 A1* | 3/2020 | Masuda | B60W 50/0205 |
| 2020/0148261 A1 | 5/2020 | Varunjikar et al. | |
| 2020/0255026 A1* | 8/2020 | Katardjiev | G08G 1/096741 |
| 2020/0298849 A1* | 9/2020 | Tanaka | B60W 40/04 |
| 2020/0307579 A1* | 10/2020 | Mizoguchi | B62D 15/0255 |
| 2020/0391731 A1* | 12/2020 | Cheon | B60W 30/09 |
| 2021/0024059 A1* | 1/2021 | Miyamoto | B60W 10/184 |
| 2021/0089036 A1 | 3/2021 | Banzhaf | |
| 2021/0139034 A1* | 5/2021 | Otake | B60W 30/18009 |
| 2021/0394829 A1 | 12/2021 | Fujii | |
| 2022/0048567 A1 | 2/2022 | Fujii | |
| 2022/0314985 A1 | 10/2022 | Yasui | |
| 2022/0324437 A1 | 10/2022 | Blau et al. | |
| 2022/0327719 A1 | 10/2022 | Shaag et al. | |
| 2022/0333927 A1 | 10/2022 | Rosenblum et al. | |
| 2022/0333932 A1 | 10/2022 | Rosenblum et al. | |
| 2023/0150488 A1 | 5/2023 | Miyamoto et al. | |

FOREIGN PATENT DOCUMENTS

| | | | |
|---|---|---|---|
| DE | 102011011120 A1 | 8/2012 | |
| EP | 2119617 A1 * | 11/2009 | ............ B60W 50/16 |
| EP | 2141057 A1 * | 1/2010 | ................ B60T 7/22 |
| EP | 3178714 A1 * | 6/2017 | ............ B60W 10/20 |
| JP | 2004-237813 A | 8/2004 | |
| JP | 2008-247327 A | 10/2008 | |
| JP | 2009-292332 A | 12/2009 | |
| JP | 2013-100064 A | 5/2013 | |
| JP | 2015-209129 A | 11/2015 | |
| JP | 2016-057959 A | 4/2016 | |
| JP | 2017-206040 A | 11/2017 | |
| JP | 2018-089990 A | 6/2018 | |
| JP | 2018-090006 A | 6/2018 | |
| JP | 2018-177179 A | 11/2018 | |
| JP | 2019-051758 A | 4/2019 | |
| JP | 2019-151207 A | 9/2019 | |
| WO | 2019/233720 A1 | 12/2019 | |

OTHER PUBLICATIONS

Matthew et al., "A Customizable Automotive Steering System With a Haptic Feedback Control Strategy for Obstacle Avoidance Notification," 2011, vol. 60, Publisher: IEEE.*

Non-Final Office Action for U.S. Appl. No. 17/703,607 mailed on Feb. 12, 2024.

File history of related U.S. Appl. No. 17/703,592, filed Mar. 24, 2022.

File history of related U.S. Appl. No. 17/703,607, filed Mar. 24, 2022.

Non-final Office Action issued for U.S. Appl. No. 17/703,592 mailed Jul. 5, 2024.

Japanese Office Action for Japanese Patent Application No. 2021061588 mailed Sep. 17, 2024.

Japanese Office Action for Japanese Patent Application No. 2021061590 mailed Oct. 4, 2024.

Final Office Action issued for U.S. Appl. No. 17/703,592 mailed Dec. 10, 2024.

* cited by examiner

VEHICLE CONTROL DEVICE, VEHICLE, METHOD OF CONTROLLING VEHICLE CONTROL DEVICE, AND NON-TRANSITORY COMPUTER-READABLE STORAGE MEDIUM

CROSS-REFERENCE TO RELATED APPLICATION(S)

This application claims priority to and the benefit of Japanese Patent Application No. 2021-061588 filed on Mar. 31, 2021, the entire disclosure of which is incorporated herein by reference.

BACKGROUND OF THE INVENTION

Field of the Invention

The present invention relates to a vehicle control device, a vehicle, a method of controlling the vehicle control device, and a non-transitory computer-readable storage medium.

Description of the Related Art

There is known a technique of controlling steering so as to avoid an obstacle in a case where the obstacle exists in front of a traveling vehicle. The technique is disclosed in, for example, Japanese Patent Laid-Open No. 2017-206040 and Japanese Patent Laid-Open No. 2019-151207.

Meanwhile, there is also known a technique of controlling steering during traveling while keeping a vehicle in a lane (hereinafter, this operation mode will be referred to as a lane keep assist mode). In a case where an obstacle is detected ahead during traveling in the lane keep assist mode, braking and steering for avoiding a collision with the obstacle are controlled. However, the control is performed only within a range of a lane in which the vehicle is traveling.

SUMMARY OF THE INVENTION

An object of the present invention is to provide a technique of improving collision avoidance with an obstacle more than before.

In order to solve the above problem, for example, a vehicle control device of the present invention has the following configuration. That is, a vehicle control device for controlling a vehicle, comprises: a first detection unit configured to detect an out-of-lane region outside a lane in which the vehicle is traveling; a second detection unit configured to detect an obstacle; and a determination unit configured to determine that performing steering control in the out-of-lane region is approved by a driver when the vehicle enters the out-of-lane region in response to a steering operation by the driver in a case where the second detection unit detects the obstacle, the first detection unit detects the out-of-lane region, and the vehicle and the obstacle have a predetermined relationship.

Further features of the present invention will become apparent from the following description of exemplary embodiments with reference to the attached drawings.

DESCRIPTION OF THE EMBODIMENTS

Figure 1:
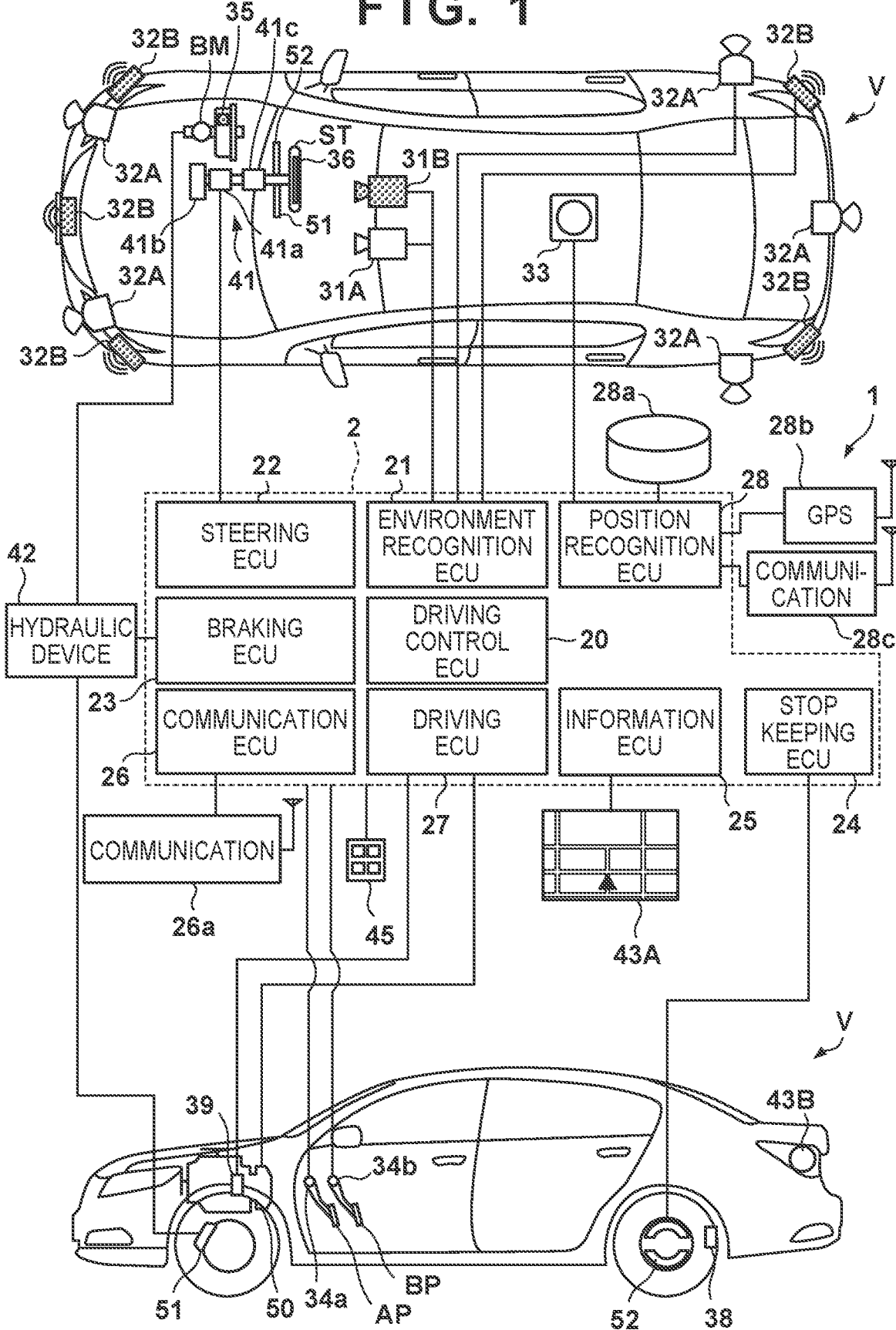
FIG. 1 is a block diagram of a vehicle and a control device according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram of a vehicle V and a control device 1 thereof according to an embodiment of the present invention. In FIG. 1, the vehicle V is schematically illustrated in a plan view and a side view. The vehicle V is, for example, a four-wheeled sedan passenger vehicle.

The vehicle V of the present embodiment is, for example, a parallel hybrid vehicle. In this case, a power plant 50, which is a traveling driving unit that outputs driving force for rotating driving wheels of the vehicle V, can include an internal combustion engine, a motor, and an automatic transmission. The motor can be used as a drive source for accelerating the vehicle V and can also be used as a generator at the time of deceleration or the like (regenerative braking).

<Control Device>

A configuration of the control device 1 that is an onboard device of the vehicle V will be described with reference to FIG. 1. The control device 1 includes an ECU group (control unit group) 2. The ECU group 2 includes a plurality of ECUs 20 to 28 that can communicate with one another. Each ECU includes a processor represented by a CPU, a storage device such as a semiconductor memory, an interface with an external device, and the like. The storage device stores programs executed by the processor, data used for processing by the processor, and the like. Each ECU may include a plurality of processors, storage devices, interfaces, and the like. Note that the number of ECUs and functions assigned to the ECUs can be designed as appropriate, and the ECUs and functions can be subdivided or integrated, when compared with the present embodiment. Note that, in FIG. 1, names of representative functions are given to the ECUs 20 to 28. For example, the ECU 20 is expressed as "driving control ECU".

The ECU 20 executes control regarding driver assistance including automated driving of the vehicle V. In the automated driving, driving (acceleration or the like of the vehicle V by the power plant 50), steering, and braking of the vehicle V are automatically performed without necessitating a driver's operation. Further, the ECU 20 can execute, for example, traveling assist control such as a collision mitigation brake and lane departure prevention in manual driving. The collision mitigation brake issues an instruction to activate brake devices 51 in a case where the possibility of collision with an obstacle ahead increases, thereby assisting collision avoidance. The lane departure prevention issues an instruction to activate an electric power steering device 41 in a case where the possibility that the vehicle V deviates from a lane increases, thereby assisting lane departure avoidance. The ECU 20 can execute automatic following control for causing the vehicle V to automatically follow a preceding vehicle in both automated driving and manual driving. In the case of automated driving, all of acceleration, deceleration, and steering of the vehicle V may be automatically performed. In the case of manual driving, acceleration and deceleration of the vehicle V may be automatically performed.

The ECU 21 is an environment recognition unit that recognizes a traveling environment of the vehicle V on the basis of detection results by detection units 31A, 31B, 32A, and 32B that detect a situation around the vehicle V. In the present embodiment, the detection units 31A and 31B are cameras that capture an image of the front of the vehicle V (hereinafter, also referred to as the camera 31A and the camera 31B) and are attached to the vehicle interior side of a windshield at the front of a roof of the vehicle V. By analyzing the image captured by the camera 31A, it is possible to extract a contour of a target object or extract a division line (white line or the like) of a lane on a road.

In the present embodiment, the detection unit 32A is a light detection and ranging (LiDAR) (hereinafter, also referred to as the LiDAR 32A), detects a target object around the vehicle V, and measures a distance from the target object. In the present embodiment, five LiDARs 32A are provided, including one at each corner portion of a front part of the vehicle V, one at the center of a rear part of the vehicle V, and one at each lateral side of the rear part of the vehicle V. The detection unit 32B is a millimeter-wave radar (hereinafter, also referred to as the radar 32B), detects a target object around the vehicle V, and measures a distance from the target object. In the present embodiment, five radars 32B are provided, including one at the center of the front part of the vehicle V, one at each corner portion of the front part of the vehicle V, and one at each corner portion of the rear part of the vehicle V.

The ECU 22 is a steering control unit that controls the electric power steering device 41. The electric power steering device 41 includes a mechanism that steers front wheels in response to a driver's driving operation (steering operation) on a steering wheel ST. The electric power steering device 41 includes a driving unit 41a including a motor that exerts driving force for assisting a steering operation or automatically steering the front wheels (also referred to as steering assist torque), a steering angle sensor 41b, a torque sensor 41c that detects torque due to steering by the driver (referred to as driver steering torque to be distinguished from steering assist torque). The ECU 22 can also acquire a detection result by a sensor 36 that detects whether or not the driver grips the steering wheel ST and can monitor the driver's gripping state.

Blinker levers 51 and 52 are provided in the vicinity of the steering wheel ST. An occupant can operate left and right direction indicator lamps (not illustrated) by operating the blinker levers 51 and 52. In the present embodiment, the occupant can issue an instruction on automatic course change of the vehicle V by operating the blinker levers 51 and 52. As the instruction on automatic course change, for example, the occupant can issue an instruction to change the lane to a left lane by operating the blinker lever 51 and can issue an instruction to change the lane to a right lane by operating the blinker lever 52. The instruction to change the course by the occupant may be acceptable during automated driving or automatic following control.

The ECU 23 is a braking control unit that controls a hydraulic device 42. The driver's braking operation on a brake pedal BP is converted into a hydraulic pressure in a brake master cylinder BM and is transmitted to the hydraulic device 42. The hydraulic device 42 is an actuator that can control a hydraulic pressure of hydraulic oil to be supplied to the brake device (for example, a disc brake device) 51 provided on each of the four wheels on the basis of the hydraulic pressure transmitted from the brake master cylinder BM, and the ECU 23 performs driving control of an electromagnetic valve and the like included in the hydraulic device 42. The ECU 23 can also turn on brake lamps 43B at the time of braking. This enables the following vehicle to give more attention to the vehicle V.

The ECU 23 and the hydraulic device 42 can constitute an electric servo brake. The ECU 23 can control, for example, distribution of the braking force by the four brake devices 51 and the braking force by regenerative braking of the motor included in the power plant 50. The ECU 23 can also achieve an ABS function, traction control, and a posture control function of the vehicle V on the basis of detection results by wheel speed sensors 38 provided for the respective four wheels, a yaw rate sensor (not illustrated), and a pressure sensor 35 that detects a pressure in the brake master cylinder BM.

The ECU 24 is a stop keeping control unit that controls electric parking brake devices (for example, drum brakes) 52 provided on the rear wheels. Each electric parking brake device 52 includes a mechanism for locking the corresponding rear wheel. The ECU 24 can control locking and unlocking of the rear wheels by using the electric parking brake devices 52.

The ECU 25 is an in-vehicle notification control unit that controls an information output device 43A that notifies the inside of the vehicle of information. The information output device 43A includes, for example, a display device provided on a head-up display or instrument panel or a sound output device. The information output device 43A may further include a vibration device. The ECU 25 causes the information output device 43A to output, for example, various types of information such as a vehicle speed and an outside air temperature, information such as route guidance, and information regarding a state of the vehicle V.

The ECU 26 includes a communication device 26a for vehicle-to-vehicle communication. The communication device 26a performs wireless communication with other surrounding vehicles to exchange information with the vehicles.

The ECU 27 is a driving control unit that controls the power plant 50. In the present embodiment, one ECU 27 is allocated to the power plant 50, but one ECU may be allocated to the internal combustion engine, the motor, and the automatic transmission. For example, the ECU 27 controls an output of the internal combustion engine or the motor or switches a gear ratio of the automatic transmission in accordance with the driver's driving operation, the vehicle speed, or the like detected by an operation detection sensor 34a provided in an accelerator pedal AP or an operation detection sensor 34b provided in the brake pedal BP. Note that the automatic transmission includes a rotation speed sensor 39 that detects the rotation speed of an output shaft of the automatic transmission as a sensor that detects a traveling state of the vehicle V. The vehicle speed of the vehicle V can be calculated on the basis of a detection result by the rotation speed sensor 39.

The ECU 28 is a position recognition unit that recognizes a current position and a course of the vehicle V. The ECU 28 controls a gyro sensor 33, a GPS sensor 28b, and a communication device 28c and performs information processing on a detection result or a communication result. The gyro sensor 33 detects a rotational motion of the vehicle V. The course of the vehicle V can be determined on the basis of the detection result by the gyro sensor 33 and the like. The GPS sensor 28b detects the current position of the vehicle V. The communication device 28c performs wireless communication with a server that provides map information and traffic information and acquires these pieces of information. A database 28a can store high accuracy map information, and thus the ECU 28 can specify the position of the vehicle V in a lane with higher accuracy on the basis of the map information and the like.

An input device 45 is disposed inside the vehicle so as to be operated by the driver and accepts an input of an instruction or information from the driver.

Control Example

A driving control mode of the vehicle V includes an automated driving mode and a manual driving mode selectable by an operation of the occupant. The automated driving mode includes a lane keep assist system mode (LKAS mode) in which the vehicle V is kept in a lane in which the vehicle is traveling. When the driver performs an operation to turn on the LKAS mode via the input device 45, the ECU 20 performs driving control according to the LKAS mode. A main point of the present embodiment is collision avoidance processing at the time of detecting an obstacle during traveling in the LKAS mode. Therefore, description of the manual driving mode is omitted.

Figure 2:
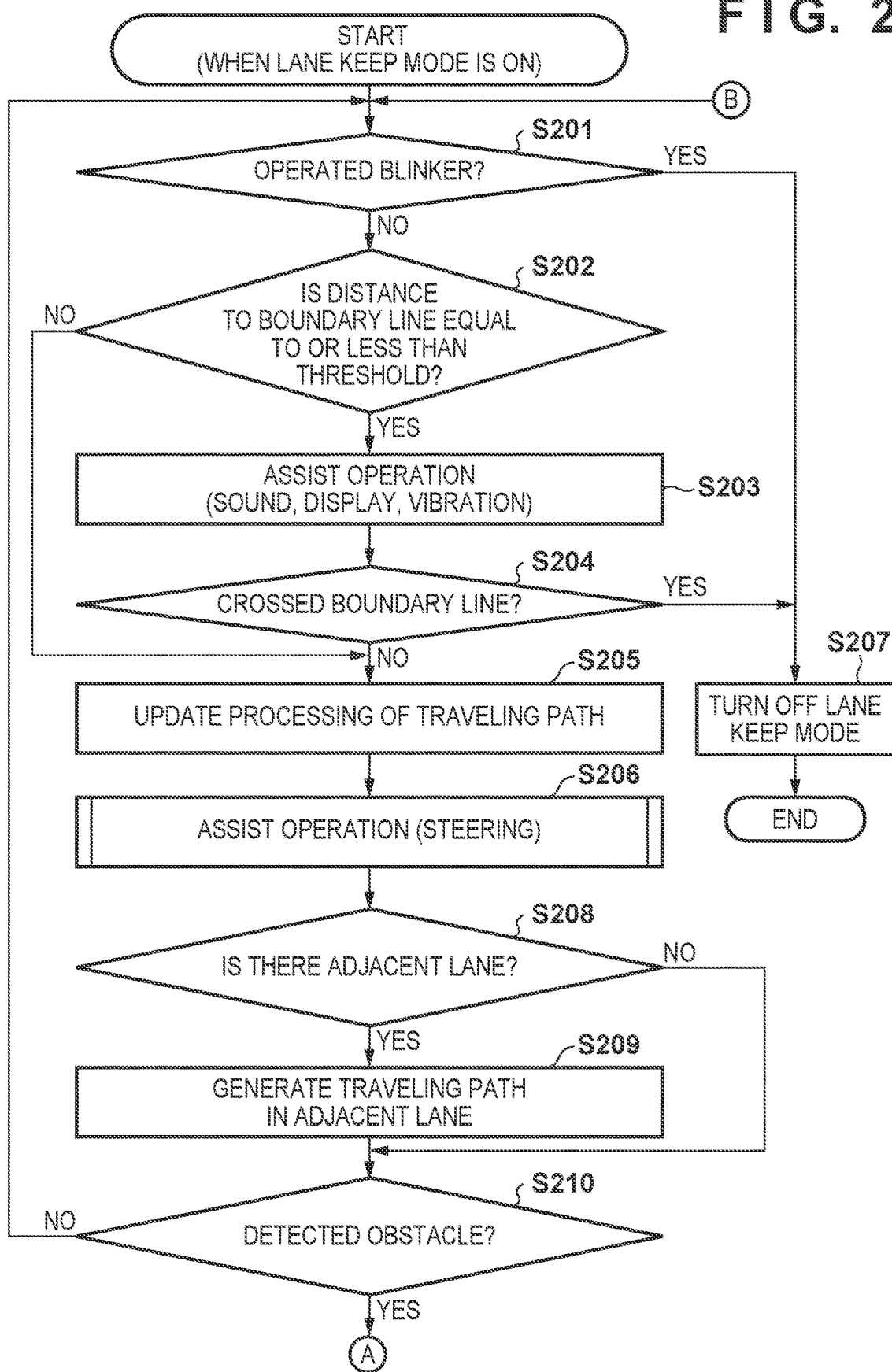
FIG. 2 is a flowchart showing processing of a lane keep mode executed by a vehicle control device.
Figure 3:
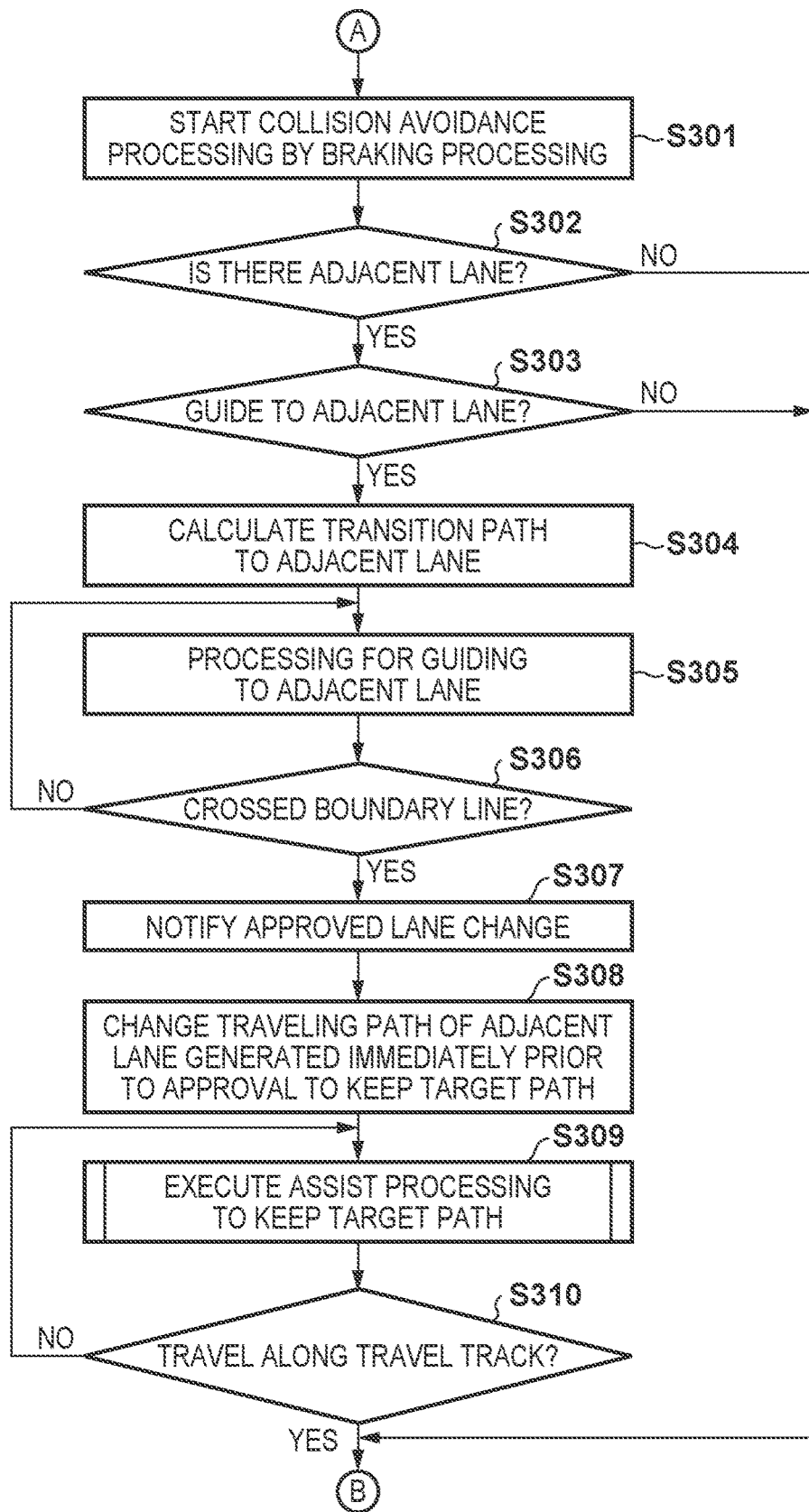
FIG. 3 is a flowchart showing processing of a lane keep mode executed by a vehicle control device.
Figure 4:
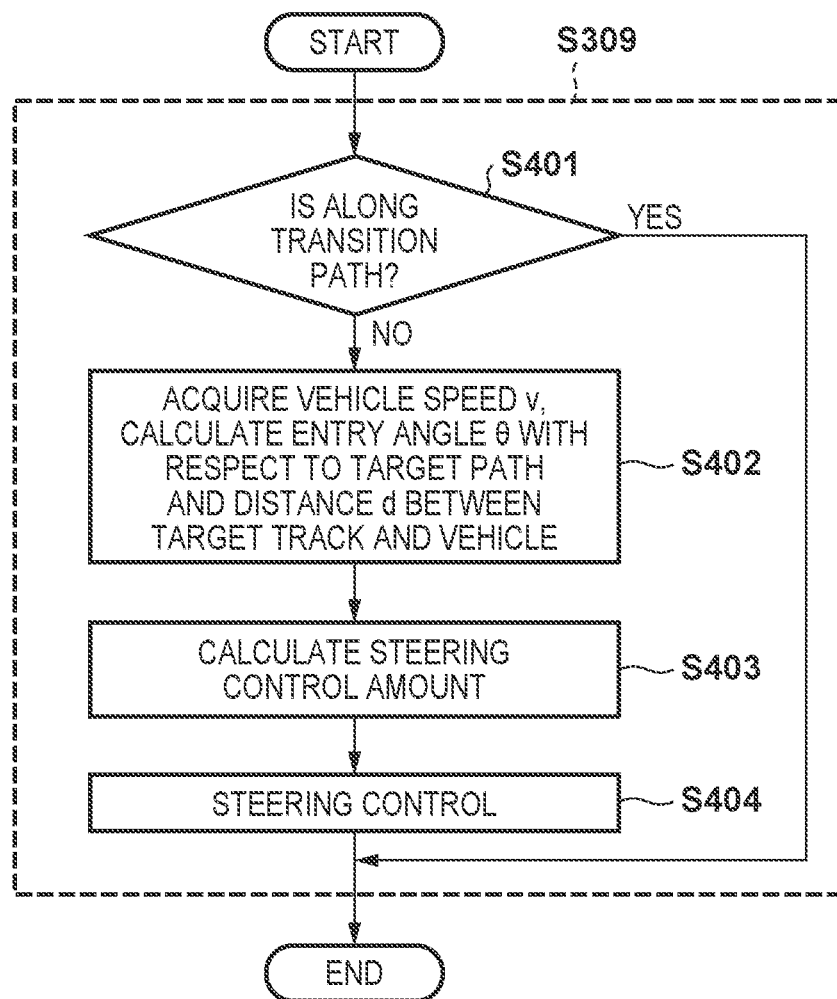
FIG. 4 is a flowchart showing details of S309 in FIG. 3.

Hereinafter, processing of the ECU 20 during traveling in the LKAS mode will be described. The flowcharts in FIGS. 2 to 4 show a processing procedure of the ECU 20 during traveling in the LKAS mode according to the embodiment.

In S201, the ECU 20 determines whether or not the driver has operated the blinker lever 51 or 52. The operation on the blinker lever 51 or 52 can be regarded as an active expression of the driver's intention to turn right, turn left, or change the lane to an adjacent lane. Therefore, the ECU 20 advances the processing to S207, turns off the LKAS mode, and terminates the present processing (switches to the manual driving mode).

In a case where the blinker lever 51 or 52 is not operated, in S202, the ECU 20 determines whether or not a distance between a lane boundary line and the vehicle V (in the embodiment, a center position between both the front wheels of the vehicle V) is equal to or less than a preset threshold. In a case where the distance is equal to or less than the threshold, the ECU 20 performs an assist operation for warning the driver in S203. For example, the ECU 20 controls the information output device 43A to display a warning message and make an alarm sound. Alternatively, a warning notification may be issued by energizing a driving unit (not illustrated) to vibrate the steering wheel ST or the like.

In S204, the ECU 20 determines whether or not the vehicle V has crossed the lane boundary line. A threshold used in the determination in S204 only needs to be a value smaller than the threshold used in S202 described above. In a case where it is determined that the vehicle V has crossed the lane boundary line, the ECU 20 advances the processing to S207, turns off the LKAS mode, and terminates the present processing.

In S205, the ECU 20 recognizes lane division lines on both sides of the lane in which the vehicle is traveling on the basis of information from the ECU 21 (cameras 31A and 31B), calculates a path passing through the center of the lane as a target path, and updates a previously calculated target path.

Then, in S206, a deviation amount of the calculated target path from the current vehicle V is obtained. Then, the ECU 20 controls the ECU 22 so that the deviation amount falls within an allowable range. The ECU 22 controls steering under the control of the ECU 20.

Next, in S208, the ECU 20 determines whether or not there is a lane adjacent to the lane in which the vehicle is traveling on the basis of the information from the ECU 21 (cameras 31A and 31 B). In a case where it is determined that there is an adjacent lane, in S209, the ECU 20 calculates a traveling path in the adjacent lane and updates a previously calculated traveling path in the adjacent lane (if it exists).

In S210, the ECU 20 determines whether or not there is an obstacle (typically, a person) ahead in the lane in which the vehicle is traveling on the basis of the information from the ECU 21 (cameras 31A and 31 B). If not, the ECU 20 returns the processing to S201 and repeats the processing in S201.

Herein, specific control processing by the ECU 20 in the LKAS mode will be described with reference to FIGS. 5 and 6.

Figure 5:
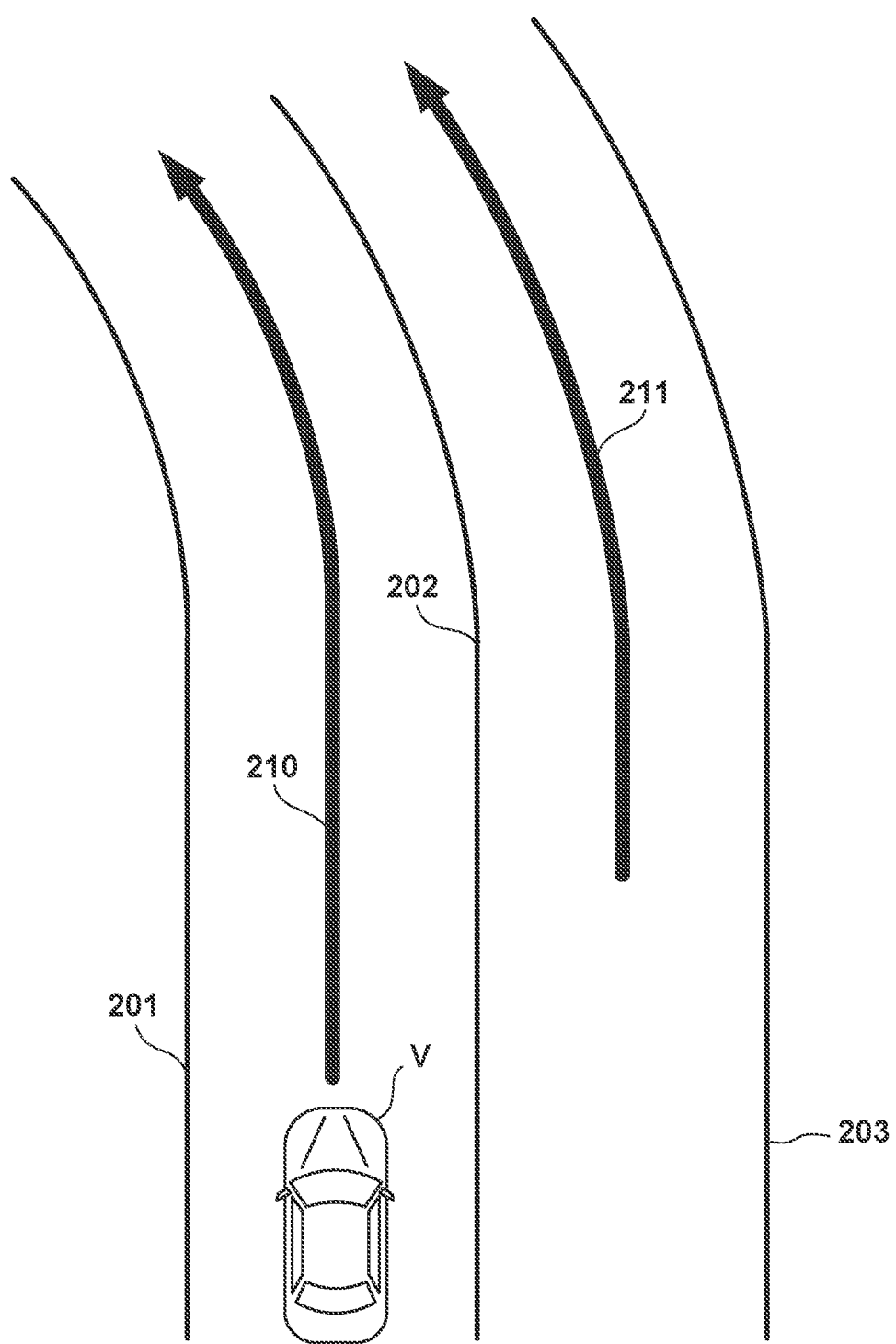
FIG. 5 is an explanatory diagram illustrating traveling of a vehicle and details of processing in a lane keep mode in an embodiment.
Figure 6:
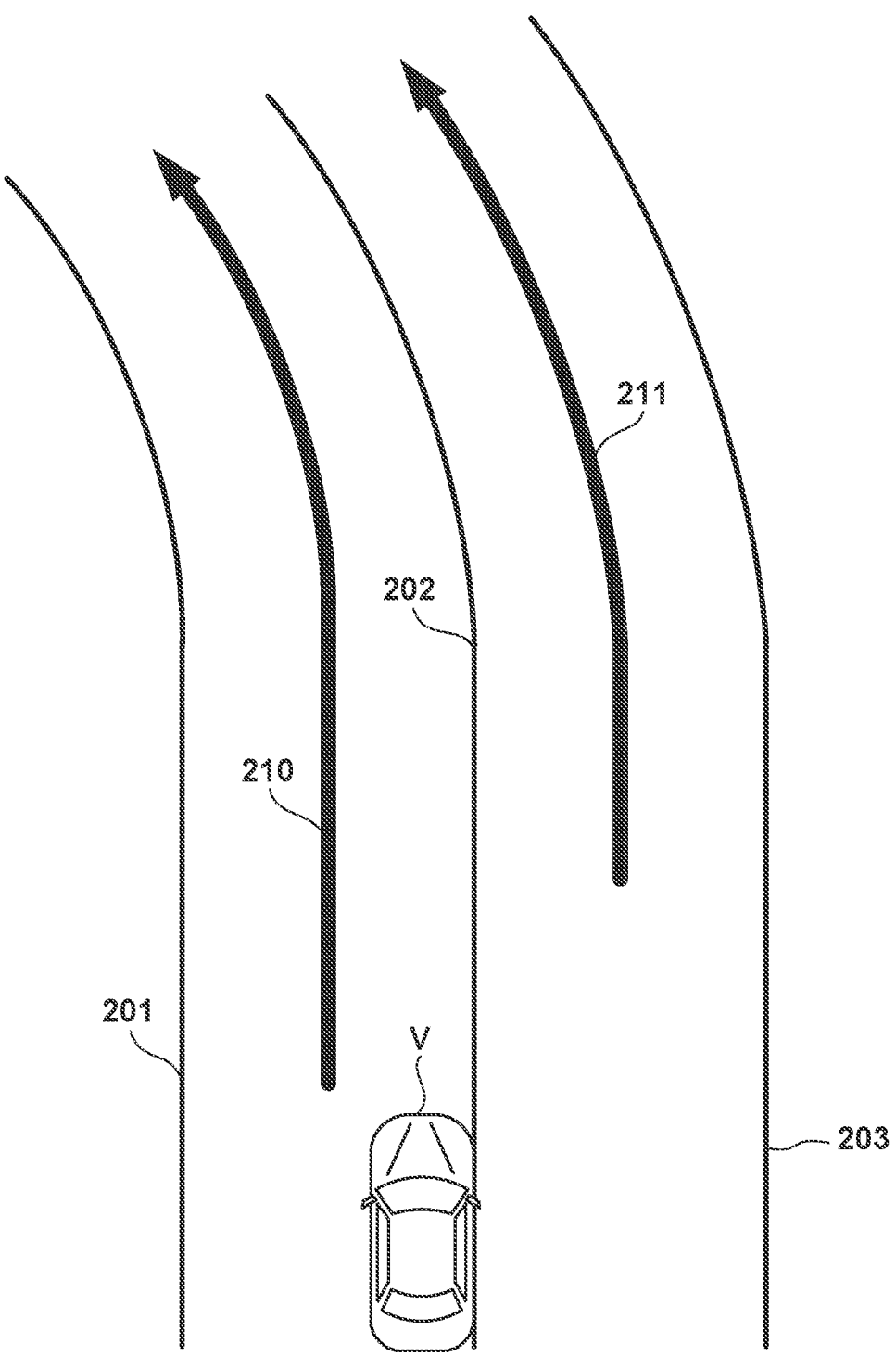
FIG. 6 is an explanatory diagram illustrating traveling of a vehicle and details of processing in a lane keep mode in an embodiment.

FIG. 5 illustrates a relationship between the vehicle V traveling in the LKAS mode and a road. In FIG. 5, the ECU 20 of the vehicle V detects boundary lines 201 and 202 of a lane on the basis of the images from the cameras 31A and 31B supplied from the ECU 21. Then, the ECU 20 sequentially calculates and updates a path passing through the center of the boundary lines 201 and 202 as a target path 210 (S205). Then, the ECU 20 causes the vehicle V to move along the target path 210 (S206). For example, the vehicle V keeps a current state while traveling within a predetermined allowable range centered on the target path 210. In a case where the vehicle V deviates to the right, for example, beyond the allowable range, the ECU 20 causes the ECU 22 to control steering according to the deviation amount and the vehicle speed, thereby keeping traveling along the target path 210.

In a case where the driver operates the blinker lever 51 or 52 or performs an operation to turn off the LKAS mode via the input device 45 during traveling in the LKAS mode, the ECU 20 transitions from the LKAS mode to the manual driving mode. Meanwhile, in a case where the driver operates the steering wheel ST without operating the blinker lever 51 or 52 and the vehicle V approaches the boundary line 202 beyond the allowable range, for example, as illustrated in FIG. 6, the ECU 20 warns the driver via a notification unit such as sound, display, and vibration (S203) and causes the ECU 22 to guide the vehicle V within the allowable range. Then, in a case where the driver still performs an operation to cross the boundary line 202 without operating the blinker levers against the guidance, the LKAS mode transitions to the manual driving mode.

The above is the basic control processing in the LKAS mode by the ECU 20. One of characteristics of the processing performed by the ECU 20 in the present embodiment is that the processing in S208 and S209 is performed during control in the LKAS mode. This will be described again with reference to FIG. 5.

In a case where the ECU 20 can detect a boundary line 203 outside the lane in which the vehicle V is traveling while controlling the vehicle V to travel along the target path 210 in the LKAS mode, the ECU 20 determines that there is an adjacent lane (Yes in S208) and calculates and updates a traveling path 211 passing through the center of the adjacent lane sandwiched between the boundary lines 202 and 203 in that case. The ECU 20 uses the traveling path 211 to avoid a collision at the time of detecting an obstacle (e.g., a person). Hereinafter, processing of the ECU 20 at the time of detecting the obstacle will be described.

FIG. 3 is a flowchart showing the processing of the ECU 20 in a case where the ECU 20 detects an obstacle during traveling in the LKAS mode (in a case where the determination in S210 of FIG. 2 is Yes).

In S301, the ECU 20 starts collision avoidance assist processing mainly including braking control. As a result, collision avoidance processing by deceleration or stop processing is started as necessary in the lane in which the vehicle is traveling. Note that processing described below is performed in parallel to the collision avoidance assist processing.

In S302, the ECU 20 determines whether or not the adjacent lane has already been detected. Then, in S303, the ECU 20 determines whether to guide the vehicle to the path 211 in the adjacent lane. In the embodiment, a probability value of collision avoidance with the obstacle only by braking and steering control in the lane in which the vehicle V is currently traveling is calculated on the basis of a traveling speed of the vehicle V and positions of the vehicle V and the obstacle and a distance therebetween in the lane in which the vehicle V is traveling. Then, in a case where the calculated probability value is equal to or less than a predetermined threshold (in a case where there is a high probability of collision in the current lane), the ECU 20 determines to guide the vehicle to the adjacent lane.

In a case where the ECU 20 determines to guide the vehicle to the adjacent lane, the ECU 20 advances the processing to S304. In S304, the ECU 20 calculates a connection path (hereinafter, referred to as a transition path) to the path 211 in the adjacent lane on the basis of a current positional relationship between the vehicle V and the obstacle and the traveling speed of the vehicle.

Figure 7:
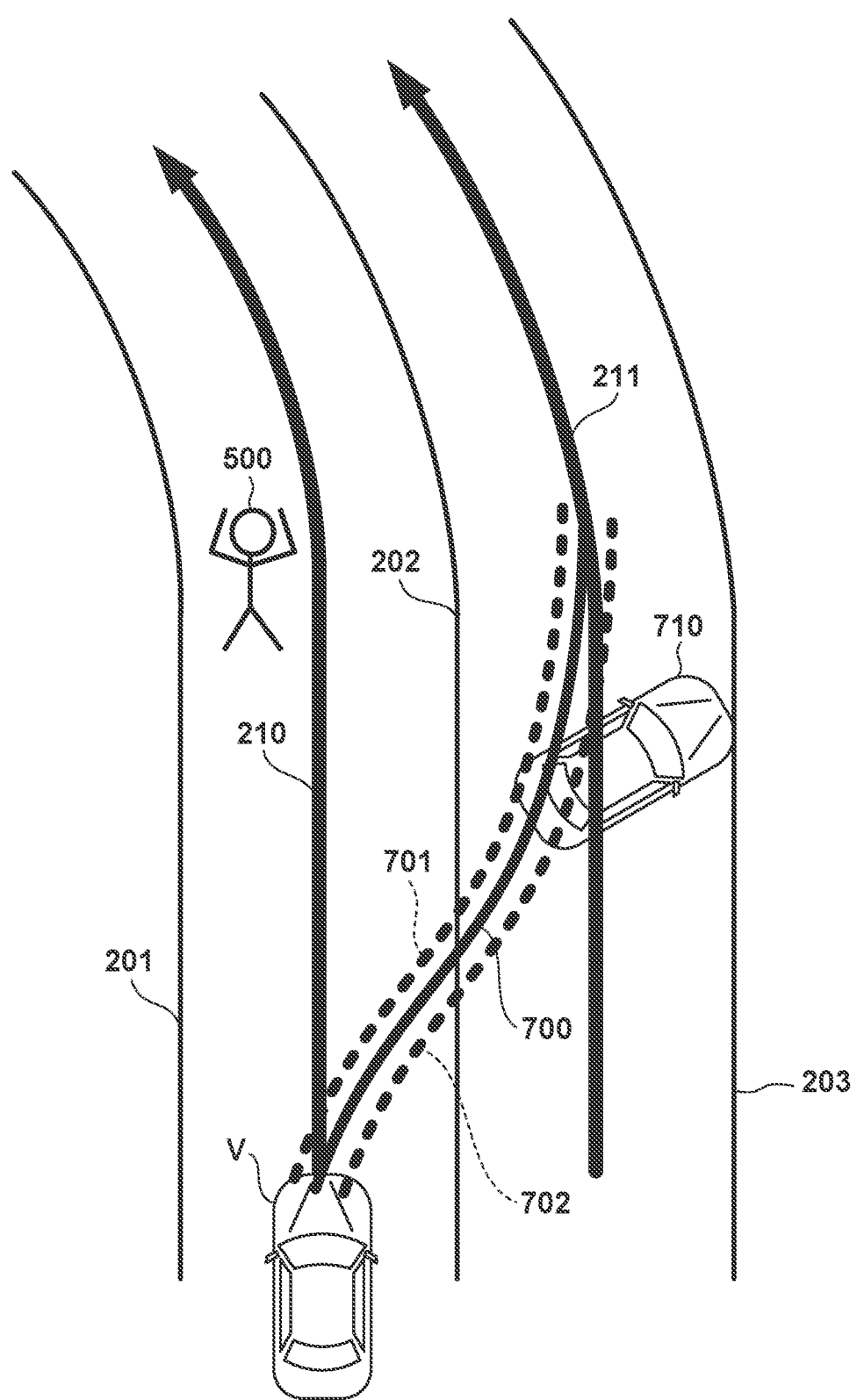
FIG. 7 is an explanatory diagram illustrating a driving example at the time of detecting an obstacle.

A line segment 700 in FIG. 7 is the transition path calculated in S304. The transition path 700 is a gentle curve with respect to both the target path 210 through which the vehicle is currently traveling and the path 211 in the adjacent lane while avoiding the obstacle. A range between allowable range paths 701 and 702, which indicates a range of a distance preset from the transition path 700, is an allowable range of the transition path 700.

In S305, the ECU 20 controls the ECU 25 to guide the vehicle to travel along the transition path 700 (or within the allowable range of the transition path). The word "guide" herein includes a steering wheel assist processing for causing the vehicle to travel along the transition path 700 and, in the embodiment, further includes processing for highlighting (e.g., blinking in red) a symbol that intuitively prompts the driver to move to the right lane, such as ">>", on a screen and making a warning sound for calling attention.

Herein, the processing in S305 will be described in more detail.

The vehicle V travels on the left side of the allowable range path 701 of the transition path 700 in FIG. 7, travels between the allowable range paths 701 and 702, or travels on the right side of the allowable range path 702 during this guidance. In a case where the ECU 20 of the embodiment determines that the vehicle is traveling on the left side of the allowable range path 701 of the transition path 700, the ECU 20 determines that an operation amount of the steering wheel ST for collision avoidance with an obstacle 500 by the driver is deficient, obtains a steering amount that compensates for the deficiency of the operation amount, performs steering control in accordance with the obtained steering amount, and guides the vehicle so that the vehicle enters the adjacent lane.

Meanwhile, the ECU 20 of the embodiment travels on the right side of the allowable range path 702 of the transition path 700 in a case where the driver excessively operates the steering wheel ST in order to avoid a collision with the obstacle 500. An entry angle with respect to the adjacent lane is excessively increased, and the vehicle may reach the boundary line 203 of the adjacent lane depending on the vehicle speed. In a case where some object such as a wall exists on the boundary line 203, there is a possibility of a secondary collision with the object existing in the vicinity of the boundary line 203. Therefore, in the present embodiment, in a case where the vehicle V travels on the right side of the allowable range path 702 of the transition path 700 due to the excessive operation of the steering wheel ST by the driver, the ECU 20 performs steering control to reduce the entry angle with respect to the adjacent lane.

In S306, the ECU 20 determines whether or not the vehicle has entered the adjacent lane beyond the boundary line 202. Note that the determination on entry into the adjacent lane is made by determining whether or not a preset position of the vehicle V (e.g., one front wheel or a front corner position of the vehicle) has reached the boundary line of the adjacent lane.

When the entry into the adjacent lane is detected, in S307, the ECU 20 determines that the guidance to the adjacent lane has been approved by the driver and controls the ECU 25 to notify the driver that processing for switching lanes is started. For example, a message or the like indicating that the vehicle is transitioning to the adjacent lane is displayed. Instead of (or in addition to) the display of the message, a sound indicating that authentication of movement to the adjacent lane has been confirmed may be output. Then, in S308, the ECU 20 sets the path 211 calculated in the latest S209 as a new target path while keeping an on state of the LKAS mode.

After entering the adjacent lane, the vehicle V at that time is not necessarily traveling along the transition path 700. Even at this stage, the driver may excessively operate the steering wheel ST at the time of finding the obstacle. In a case where the steering wheel ST is excessively operated, the vehicle may move to the boundary line 203 depending on the speed at that time as indicated by a reference sign 710 in FIG. 7. In a case where an obstacle happens to exist at that position on the boundary line 203, a secondary collision may even occur.

Therefore, in the present embodiment, stronger steering assist control is started in S309 in a period until the vehicle normally travels along the path 211. Then, the assist processing in S309 continues until it is determined in S310 that the vehicle stably travels along the traveling path 211.

The assist processing in S309 will be described below.

In a case where the vehicle V is traveling along the transition path 700, the vehicle V only needs to keep the traveling state. The traveling along the transition path 700 in this case is that the vehicle travels while simultaneously satisfying the following conditions. A first condition is that the vehicle travels within the range between the allowable range paths 701 and 702 of the transition path 700. A second condition is that an angle between a tangential direction at a point corresponding to the position of the vehicle V on a coordinate axis orthogonal to the path 211 on the transition path 700 and a traveling direction of the vehicle V is equal to or less than a preset threshold.

In a case where at least one of the above conditions is not satisfied, the ECU 20 in the embodiment determines that it is impossible to travel along the transition path 700. For example, this is a case where the driver excessively operates the steering wheel ST. In this case, instead of performing traveling control on the transition path 700, the ECU 20 switches to steering assist processing for smoothly transitioning to the path 211 without reaching the boundary line 203. The steering assist processing in this case will be described with reference to FIGS. 8A and 8B.

Figure 8A:
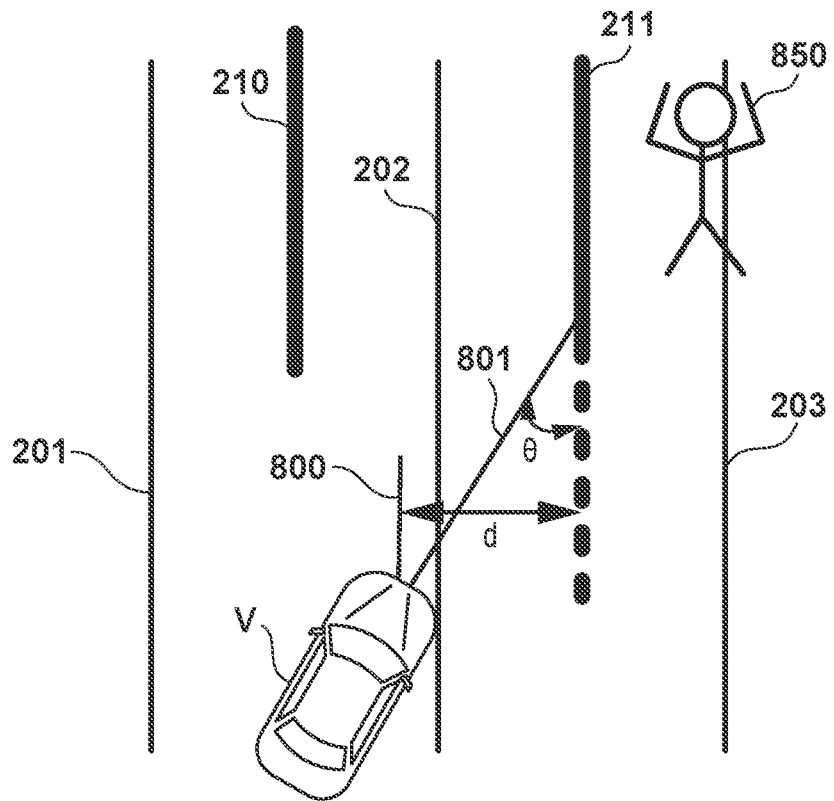
FIGS. 8A and 8B are explanatory diagrams of the processing in S309 of FIG. 3.

FIG. 8A illustrates a state in which the driver excessively turns the steering wheel ST and the vehicle V enters the adjacent lane. In FIG. 8A, a center position of both the front wheels is represented by a reference sign 800, and a line segment 801 indicates a traveling direction of the vehicle V. The symbols θ and d are defined as follows.

The symbol θ represents an angle between the traveling direction 801 of the vehicle V and (an extension line of) the path 211. The symbol d represents a distance between the vehicle V and the extension line of the path 211. The distance d is defined as having a positive value on the left side of the path 211 serving as an origin and a negative value on the right side thereof. Further, although not illustrated, the vehicle speed of the vehicle V is defined as v.

Figure 8B:
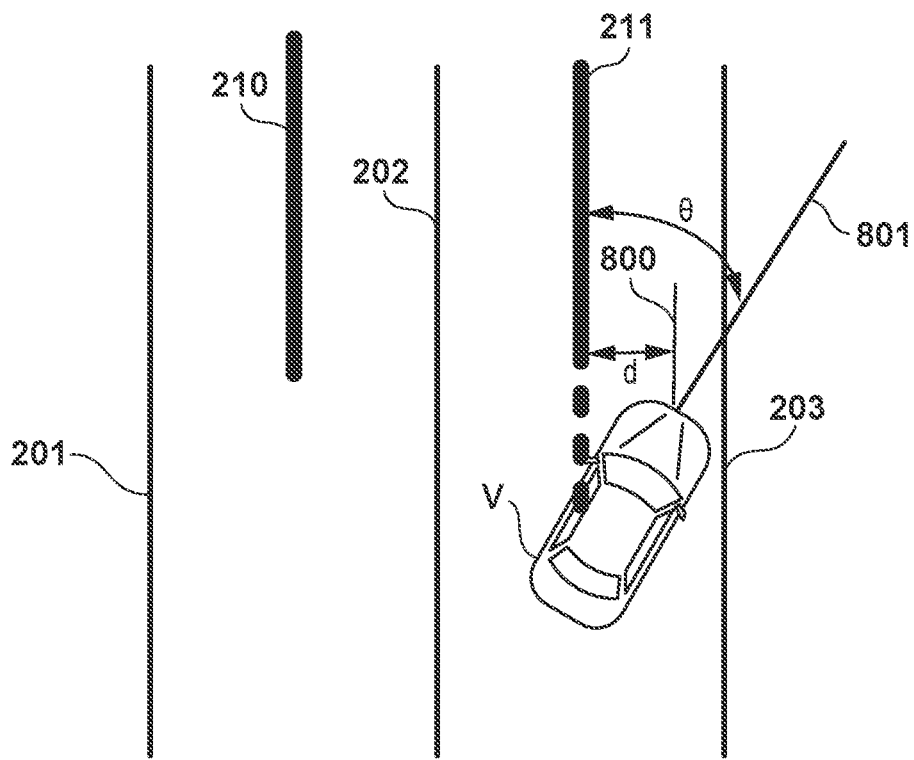

In this case, it is obvious that the possibility that the vehicle V moves to the position of the boundary line 203 increases as the vehicle speed v increases, as the distance d decreases (as the negative absolute value increases), and as the angle increases (up to 90 degrees). For example, even in a case where the vehicle speed v and the angle θ in FIG. 8B are the same as those in FIG. 8A, the possibility that the vehicle V moves to the boundary line 203 is much higher in FIG. 8B than in FIG. 8A. That is, a control amount for controlling steering so as to prevent the vehicle V from positioning on the boundary line 203 can be obtained by a function $f(\theta, d, v)$ including those three parameters θ, d, and v as arguments.

FIG. 4 is a flowchart showing details of the assist processing in S309 of FIG. 3. Hereinafter, processing of the ECU 20 will be described with reference to FIG. 4.

In S401, the ECU 20 determines whether or not the vehicle V is traveling along the transition path 700. Determination conditions for determining whether or not the vehicle is traveling along the transition path 700 are as described above. In a case where the determination in S401 is Yes, the ECU 20 does not perform the following processing and advances the processing to S310 in FIG. 3.

In a case where the determination in S401 is No, that is, in a case where the vehicle V is not traveling along the transition path 700, the ECU 20 advances the processing to S402.

In S402, the ECU 20 acquires the vehicle speed v via the ECU 27 and calculates the entry angle θ of the vehicle V with respect to the target path 211 and the distance d between the target path 211 and the vehicle V on the basis of the information of the ECU 21 and the like.

Next, in S403, the ECU 20 obtains a steering control amount for avoiding reaching the boundary line 203 in accordance with a function prepared in advance on the basis of the vehicle speed v, the angle θ, and the distance d. Note that the time related to the calculation can be ignored by using a lookup table to which v, θ, and d are input, instead of calculating the control amount.

Then, in S404, the ECU 20 controls the ECU 22 so as to achieve the obtained steering amount.

The above is the details of the processing in S309. The determination on whether to terminate the assist processing in S310 of FIG. 3 is made in a case where the following two conditions 1 and 2 are simultaneously satisfied.

Condition 1: The distance d falls within an allowable range during traveling through a path in the LKAS mode.

Condition 2: The angle θ is equal to or less than a threshold.

According to the above description, in a case where the driver performs an operation to deviate from the allowable range (the range between the reference signs 701 and 702) of the transition path 700 while the vehicle V is traveling within the allowable range, the determination in S401 is No. That is, the ECU 20 switches a target from the transition path 700 to the traveling path 211. However, in a case where the driver performs an operation of approaching the boundary of the allowable range (the range between the reference signs 701 and 702) while the vehicle is traveling within the allowable range of the transition path 700, the ECU 20 may perform steering control to return to the transition path 700.

In the above description of FIG. 4, in a case where the vehicle V enters the adjacent lane and a traveling position at that time deviates from the transition path, the ECU 20 performs steering control by using θ, v, and d as parameters. However, for example, in a case where an obstacle 850 exists in the traveling direction in the state of FIG. 8A, the ECU 20 may calculate a collision avoidance path in order to avoid a secondary collision therewith and issue, for example, a notification to prompt the driver to turn the steering wheel ST to the left in accordance with the calculated collision avoidance path. In a case where the driver performs an operation to turn the steering wheel ST to the left upon receipt of this notification, the ECU 20 may determine that the notification has been approved and start assist processing by steering control of the steering wheel ST in the operation direction. Meanwhile, in a case where the collision avoidance path for the obstacle 850 cannot be calculated, the ECU 20 may perform braking control.

Figure 9:
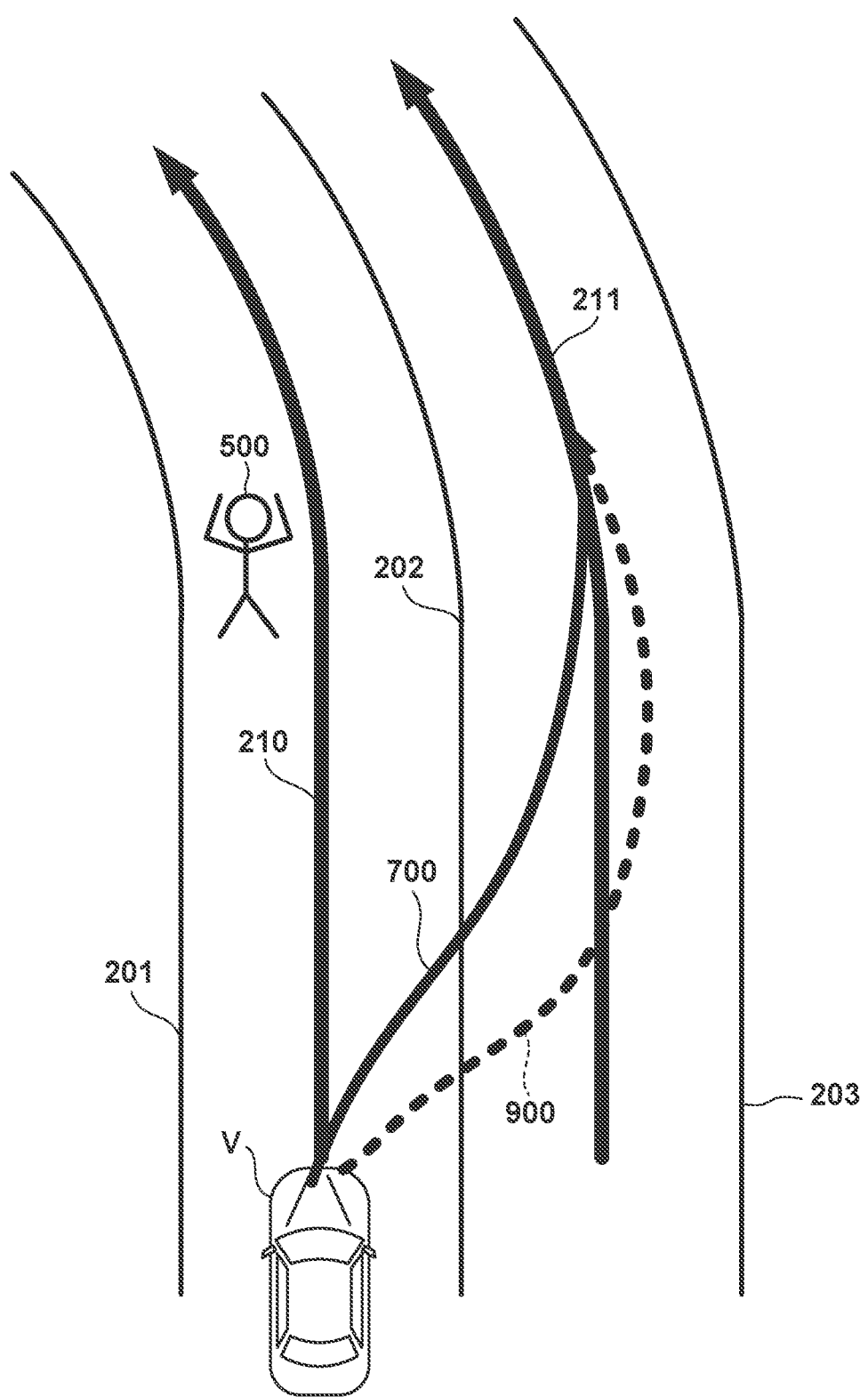
FIG. 9 illustrates an example of a traveling path based on a processing result for collision avoidance.

FIG. 9 illustrates a movement path 900 of the vehicle V until the vehicle V travels along the path 211 in a case where the driver excessively operates the steering wheel ST to avoid an obstacle. FIG. 9 illustrates a case where a traveling path obtained when the driver operates the steering wheel ST deviates from the transition path 700 from the beginning. Even if, at the time of finding an obstacle, the driver operates the steering wheel ST to deviate from the transition path 700 prepared by the system as illustrated in FIG. 9, it is possible to perform steering control to smoothly transition to the path 211 while preventing the vehicle from reaching the boundary line 203 according to the present embodiment.

In summary, in a case where the obstacle 500 appears in the traveling direction during traveling along the target path 210 in the LKAS mode, whether to retreat to the adjacent lane is determined in the embodiment. Then, in a case where it is determined that it is desirable to switch to the adjacent lane, the driver is prompted to travel along the transition path 700. Then, in a case where the driver actually performs an operation to enter the adjacent lane, the EUC 20 determines that the switching assist to the adjacent lane has been approved by the driver and switches to the traveling path 211 while keeping the on state of the LKAS mode. In the embodiment, it is possible to know that the system is performing safe processing for collision avoidance and therefore gain a sense of security. Further, even if the steering wheel is operated more than necessary in order to avoid a collision with an obstacle, steering control stronger than the LKAS is performed at an early stage after the vehicle enters the adjacent lane. Therefore, it is possible to restrain traveling beyond the lane, and it is also possible to restrain the possibility of a secondary collision.

Other Embodiments

In the above embodiment, the description has been made under the condition that the vehicle travels while keeping the on state of the LKAS mode. Generally, in a case where the vehicle moves to the adjacent lane (changes lanes) without operating the blinker levers while traveling with the LKAS mode on, the LKAS mode is turned off. However, according to the above embodiment, in a case where the vehicle enters the adjacent lane in order to avoid a collision with an obstacle, it is possible to keep the on state of the LKAS mode in the adjacent lane without any special operation, which is advantageous. However, in a case where it is unnecessary to keep the LKAS before and after switching traveling lanes, the condition that the vehicle is traveling with the LKAS mode on may be excluded in the processing related to collision avoidance with an obstacle described in the above embodiment. In this case, it is only necessary to determine that steering control in the adjacent lane has been approved by the driver on the condition that a value indicating the probability of collision avoidance with an obstacle is smaller than the threshold and the vehicle has entered the adjacent lane in response to steering of the steering wheel ST by the driver (there is no condition regarding the LKAS mode).

Further, the path 211 passing through the center of the adjacent lane is set as a traveling path when the transition to the adjacent lane is completed. However, in a case where the LKAS mode is not required, a position of the path after the transition is completed is not particularly limited as long as the path can avoid a collision with an initial obstacle.

In the above embodiment, the description has been made on the assumption that there is no other vehicle traveling in the adjacent lane. However, in a case where there is some object in the adjacent lane and it is estimated that a distance between the object and the vehicle V is equal to or less than a preset distance, guidance to the adjacent lane may not be performed.

Specifically, for example, in a case where the adjacent lane is a passing lane, a step of determining whether or not another vehicle traveling within a predetermined distance behind the self-vehicle in the passing lane has been detected (which can be detected by the radar 32B) may be provided immediately after S303 in FIG. 3. Then, in a case where a result of the determination shows that no vehicle exists, the processing may proceed to S304. In a case where the adjacent lane is an oncoming lane, a step of determining whether or not there is another vehicle coming from the front within a predetermined distance (which can be detected by the camera 32A) may be provided immediately after S303 in FIG. 3. Then, in a case where a result of the determination shows that no vehicle exists, the processing may proceed to S304. In a case where the vehicle safely travels in both cases where the adjacent lane is a passing lane and an oncoming lane, the above two determinations may be successively provided immediately after S303. Then, in a case where results of both the determinations show that no vehicle exists, the processing may proceed to S304.

Note that whether or not the lane is a passing lane or oncoming lane may be determined on the basis of information (the current position of the vehicle V and information of a navigation system) from the ECU 28.

In the above embodiment, the description has been made on the assumption that braking control is performed in S301 when an obstacle is found. However, the braking control may be executed in a case where it is determined that the vehicle does not retreat to the adjacent lane, in a case where the determination in S302 is No, or in a case where the determination in S303 is No.

In the embodiment, a target to be used for collision avoidance with an obstacle is an adjacent lane. However, the present invention is not limited thereto. For example, the target may be a certain degree of vacant land such as a shoulder.

Summary of Embodiments

The above embodiments disclose at least the following embodiments.

1. According to the above embodiments, there is provided a vehicle control device for controlling a vehicle, the vehicle control device comprising:
   a first detection unit configured to detect an out-of-lane region outside a lane in which the vehicle is traveling;
   a second detection unit configured to detect an obstacle; and
   a determination unit configured to determine that performing steering control in the out-of-lane region is approved by a driver when the vehicle enters the out-of-lane region in response to a steering operation by the driver in a case where the second detection unit detects the obstacle, the first detection unit detects the out-of-lane region, and the vehicle and the obstacle have a predetermined relationship.

According to this embodiment, it is determined that the steering control in the out-of-lane region has been approved by the driver's steering operation to enter the out-of-lane region. This makes it possible to further improve collision avoidance with the obstacle. In the above, the performing of steering control is a control to assist the steering.

2. According to the above embodiments, the entry into the out-of-lane region is determined in a case where a predetermined position of the vehicle enters the out-of-lane region.

According to this embodiment, it is possible to perform the steering control in the out-of-lane region at an early stage of the entry into the out-of-lane region.

3. According to the above embodiments, the vehicle control device further comprises
   a traveling control unit configured to cause the vehicle to travel in a determined region, wherein
   in a case where steering control by the driver is performed with a predetermined force or more, the steering control by the driver is executed in preference to the steering control by the traveling control unit.

According to this embodiment, the driver can select to follow the guidance by the system or perform a steering operation by the driver himself/herself.

4. According to the above embodiments, the vehicle control device further comprises
- a guiding unit configured to guide the vehicle to the out-of-lane region in a case where the vehicle and the obstacle have the predetermined relationship and the vehicle is traveling without entering the out-of-lane region.

According to this embodiment, it is possible to guide the vehicle to the out-of-lane region with a high possibility of the collision avoidance.

5. According to the above embodiments, the guiding unit restricts performing the guidance in a case where, after the vehicle enters the out-of-lane region, an amount of steering by the driver of the vehicle falls within a predetermined range of a steering amount obtained by the traveling control unit. For example, the guiding unit does not perform the guidance in a case where, after the vehicle enters the out-of-lane region, an amount of steering by the driver of the vehicle falls within a predetermined range of a steering amount obtained by the traveling control unit.

According to this embodiment, it is possible to prevent unnecessary guidance in a case where the vehicle travels along a path in the out-of-lane region prepared by the system.

6. According to the above embodiments, the vehicle control device further comprises
- a steering control unit configured to, in a case where the vehicle and the obstacle have the predetermined relationship, control steering in a transition period in which a path in the lane in which the vehicle is traveling is switched to a path for traveling in the out-of-lane region, wherein
- the steering control unit
- includes a calculation unit configured to calculate a transition path in the transition period,
- restricts performing guidance regarding the steering in a case where the vehicle travels along the transition path calculated by the calculation unit in response to a steering operation by the driver (for example, does not perform guidance regarding the steering in a case where the vehicle travels along the transition path calculated by the calculation unit in response to a steering operation by the driver), and
- executes steering control processing until the vehicle transitions to the path for traveling in the out-of-lane region in a case where the vehicle deviates from the transition path calculated by the calculation unit in response to a steering operation by the driver.

According to this embodiment, it is unnecessary to guide the driver as long as the vehicle travels along the transition path, and, even in a case where the vehicle travels while deviating from the transition path, the driver can receive steering assist until the vehicle safely travels in the out-of-lane region. This makes it possible to give the driver a sense of security.

7. According to the above embodiments, the vehicle control device further comprises
- a setting unit configured to set the out-of-lane region as the region by the traveling control unit in a case where the approval is acquired while the vehicle is traveling in the lane under the control of the traveling control unit.

According to this embodiment, even in a case where the vehicle moves to the adjacent lane to avoid the collision with the obstacle, the vehicle can continuously travel in the adjacent lane without any special operation.

8. According to the above embodiments, the out-of-lane region is an adjacent lane.

According to this embodiment, it is possible to use the adjacent lane for avoiding the collision with the obstacle.

9. According to the above embodiments, the vehicle control device further comprises
- a calculation unit configured to calculate a value indicating a possibility of avoiding a collision between the vehicle and the obstacle, wherein
- the predetermined relationship is that the value calculated by the calculation unit is equal to or less than a predetermined threshold.

According to this embodiment, it is possible to guide the vehicle to the out-of-lane region where the probability of the collision avoidance with the obstacle is higher than that in the lane in which the vehicle is traveling.

10. According to the above embodiments, the vehicle control device further comprises
- a braking control unit configured to, in a case where the second detection unit detects the obstacle, perform assist processing by braking control for avoiding the collision with the obstacle in the lane in which the vehicle is traveling, wherein
- the calculation unit calculates the value during the assist processing by the braking control unit.

According to this embodiment, the lane is switched to the out-of-lane region after normal assist for the collision avoidance using braking control is performed. This makes it possible to give the driver a further sense of security.

11. According to the above embodiments, the guiding unit restricts performing the guidance in a case where, when the vehicle enters the out-of-lane region and travels after the obstacle is detected, the vehicle is predicted to come into contact with another object in the out-of-lane region. For example, the guiding unit does not guide the vehicle to the out of lane region in a case where, when the vehicle enters the out-of-lane region and travels after the obstacle is detected, the vehicle is predicted to come into contact with another object in the out-of-lane region.

In this case, it is possible to avoid a collision with another object in the out-of-lane region.

12. According to the above embodiment, a vehicle including the vehicle control device having any of the above configurations is provided. As a result, the vehicle can have the functions and effects described above.

13. According to the above embodiments, there is provided a method of controlling a vehicle control device for controlling a vehicle, the method comprising:
- detecting an out-of-lane region outside a lane in which the vehicle is traveling;
- detecting an obstacle; and
- determining that performing steering control in the out-of-lane region is approved by a driver when the vehicle enters the out-of-lane region in response to a steering operation by the driver in a case where the obstacle is detected in the detecting the obstacle, the out-of-lane region is detected in the detecting the out-of-lane region, and the vehicle and the obstacle have a predetermined relationship.

According to this embodiment, it is determined that the steering control in the out-of-lane region has been approved by the driver's steering operation to enter the out-of-lane region. This makes it possible to further improve collision avoidance with the obstacle.

14. According to the above embodiments, there is provided a non-transitory computer-readable storage medium storing a program to be read and executed by a processor included in a vehicle control device for controlling a vehicle, the program causing the processor to execute:
- detecting an out-of-lane region outside a lane in which the vehicle is traveling;
- detecting an obstacle; and
- determining that performing steering control in the out-of-lane region is approved by a driver when the vehicle enters the out-of-lane region in response to a steering operation by the driver in a case where the obstacle is detected in the detecting the obstacle, the out-of-lane region is detected in the detecting the out-of-lane region, and the vehicle and the obstacle have a predetermined relationship.

According to this embodiment, in a case where the program for performing those steps is set to a target to be executed by the processor (e.g., ECU) of the vehicle control device, it is possible to further improve the collision avoidance with the obstacle.

The invention is not limited to the foregoing embodiments, and various variations/changes are possible within the spirit of the invention.

What is claimed is:

1. A vehicle control device for controlling a vehicle, the vehicle control device comprising:
   one or more processors; and
   a memory storing instructions which, when the instructions are executed by the one or more processors, cause the vehicle control device to:
   detect an out-of-lane region outside a lane in which the vehicle is traveling;
   detect an obstacle; and
   determine that performing steering control in the out-of-lane region is approved by a driver when the vehicle enters the out-of-lane region in response to a steering operation by the driver in a case where the obstacle is detected, the out-of-lane region is detected, and the vehicle and the obstacle have a predetermined relationship; and
   control, in a case where the vehicle and the obstacle have the predetermined relationship, steering in a transition period in which a path in the lane in which the vehicle is traveling is switched to a path for traveling in the out-of-lane region,
   wherein the instructions causing the vehicle control device to control steering in the transition period include instructions causing the vehicle control device to:
   calculate a transition path in the transition period,
   restrict performing guidance regarding the steering in a case where the vehicle travels along the transition path calculated in response to a steering operation by the driver, and
   execute steering control processing until the vehicle transitions to the path for traveling in the out-of-lane region in a case where the vehicle deviates from the transition path calculated in response to a steering operation by the driver.

2. The vehicle control device according to claim 1, wherein
   the entry into the out-of-lane region is determined in a case where a predetermined position of the vehicle enters the out-of-lane region.

3. The vehicle control device according to claim 1, wherein the instructions further cause the vehicle control device to;
   cause the vehicle to travel in a determined region, wherein in a case where steering control by the driver is performed with a predetermined force or more, the steering control by the driver is executed in preference to the steering control.

4. The vehicle control device according to claim 3, wherein the instructions further cause the vehicle control device to
   guide the vehicle to the out-of-lane region in a case where the vehicle and the obstacle have the predetermined relationship and the vehicle is traveling without entering the out-of-lane region.

5. The vehicle control device according to claim 4, wherein the instructions cause the vehicle control device to
   restrict performing the guidance in a case where, after the vehicle enters the out-of-lane region, an amount of steering by the driver of the vehicle falls within a predetermined range of a steering amount obtained.

6. The vehicle control device according to claim 3, wherein the instructions further cause the vehicle control device to
   set the out-of-lane region as the region in a case where the approval is acquired while the vehicle is traveling in the lane under the control.

7. The vehicle control device according to claim 1, wherein
   the out-of-lane region is an adjacent lane.

8. The vehicle control device according to claim 1, wherein the instructions further cause the vehicle control device to
   calculate a value indicating a possibility of avoiding a collision between the vehicle and the obstacle, wherein
   the predetermined relationship is that the value calculated is equal to or less than a predetermined threshold.

9. The vehicle control device according to claim 8, wherein the instructions further cause the vehicle control device to
   perform, in a case where the obstacle is detected, assist processing by braking control for avoiding the collision with the obstacle in the lane in which the vehicle is traveling, wherein
   the instructions causing the vehicle control device to calculate includes instructions causing the vehicle control device to calculate the value during the assist processing by the braking control.

10. The vehicle control device according to claim 4, wherein
    the instructions causing the vehicle control device to guide the vehicle to the out-of-lane region include instructions causing the vehicle control device to perform the guidance in a case where, when the vehicle enters the out-of-lane region and travels after the obstacle is detected, the vehicle is predicted to come into contact with another object in the out-of-lane region.

11. A vehicle including a vehicle control device, wherein the vehicle control device includes
    one or more processors; and
    a memory storing instructions which, when the instructions are executed by the one or more processors, cause the vehicle control device to:
    detect an out-of-lane region outside a lane in which the vehicle is traveling,
    detect an obstacle, and
    determine that performing steering control in the out-of-lane region is approved by a driver when the vehicle enters the out-of-lane region in response to a steering operation by the driver in a case where the obstacle is detected, the out-of-lane region is detected, and the vehicle and the obstacle have a predetermined relationship; and control, in a case where the vehicle and the obstacle have the predetermined relationship, steering in a transition period in which a path in the lane in which the vehicle is traveling is switched to a path for traveling in the out-of-lane region, wherein the instructions causing the vehicle control device to control steering in the transition period include instructions causing the vehicle control device to:

calculate a transition path in the transition period, restrict performing guidance regarding the steering in a case where the vehicle travels along the transition path calculated in response to a steering operation by the driver, and execute steering control processing until the vehicle transitions to the path for traveling in the out-of-lane region in a case where the vehicle deviates from the transition path calculated in response to a steering operation by the driver.

12. A method of controlling a vehicle control device for controlling a vehicle, the method comprising:

detecting an out-of-lane region outside a lane in which the vehicle is traveling;

detecting an obstacle;

determining that performing steering control in the out-of-lane region is approved by a driver when the vehicle enters the out-of-lane region in response to a steering operation by the driver in a case where the obstacle is detected in the detecting the obstacle, the out-of-lane region is detected in the detecting the out-of-lane region, and the vehicle and the obstacle have a predetermined relationship; and controlling, in a case where the vehicle and the obstacle have the predetermined relationship, steering in a transition period in which a path in the lane in which the vehicle is traveling is switched to a path for traveling in the out-of-lane region, wherein the controlling steering in the transition period includes:

calculating a transition path in the transition period, restricting performing guidance regarding the steering in a case where the vehicle travels along the transition path calculated in response to a steering operation by the driver, and executing steering control processing until the vehicle transitions to the path for traveling in the out-of-lane region in a case where the vehicle deviates from the transition path calculated in response to a steering operation by the driver.

13. A non-transitory computer-readable storage medium storing a program to be read and executed by a processor included in a vehicle control device for controlling a vehicle, the program causing the processor to execute:

detecting an out-of-lane region outside a lane in which the vehicle is traveling;

detecting an obstacle;

determining that performing steering control in the out-of-lane region is approved by a driver when the vehicle enters the out-of-lane region in response to a steering operation by the driver in a case where the obstacle is detected in the detecting the obstacle, the out-of-lane region is detected in the detecting the out-of-lane region, and the vehicle and the obstacle have a predetermined relationship; and controlling, in a case where the vehicle and the obstacle have the predetermined relationship, steering in a transition period in which a path in the lane in which the vehicle is traveling is switched to a path for traveling in the out-of-lane region, wherein the controlling steering in the transition period includes:

calculating a transition path in the transition period, restricting performing guidance regarding the steering in a case where the vehicle travels along the transition path calculated in response to a steering operation by the driver, and executing steering control processing until the vehicle transitions to the path for traveling in the out-of-lane region in a case where the vehicle deviates from the transition path calculated in response to a steering operation by the driver.

* * * * *